May 29, 1934.                  E. BICLET                  1,960,987
              ANTI-WATER-HAMMER DEVICE FOR PIPE LINES UNDER PRESSURE
                              Filed Oct. 28, 1932
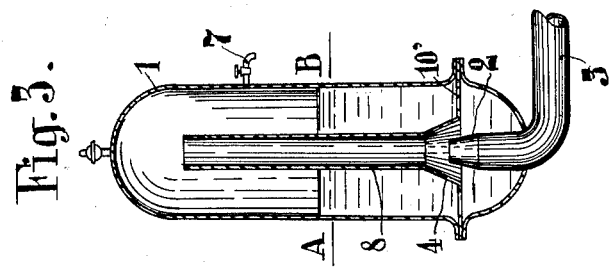
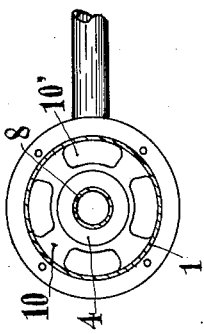
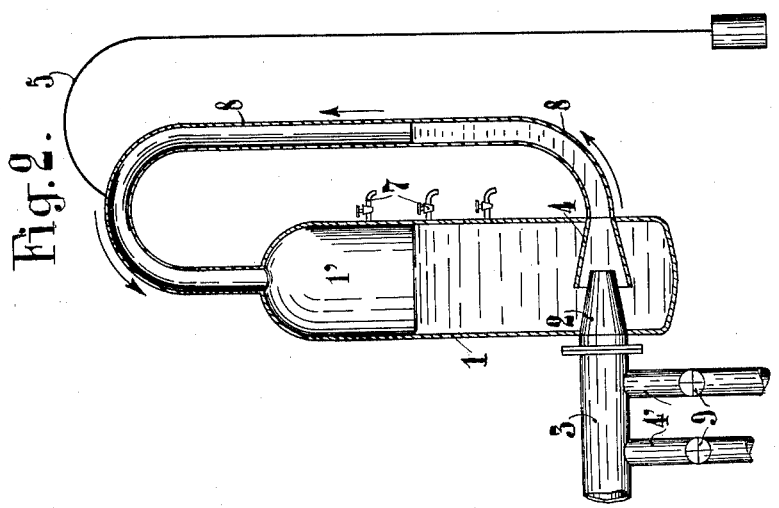
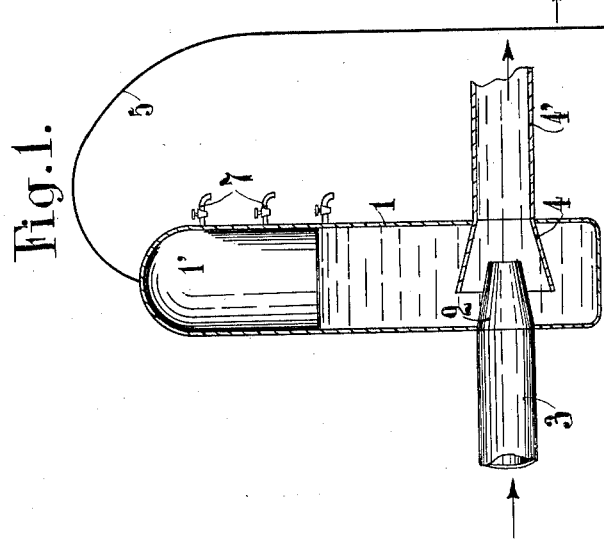
INVENTOR:
Emile Biclet
BY
ATTORNEY Patented May 29, 1934

1,960,987

UNITED STATES PATENT OFFICE 1,960,987

ANTI-WATER-HAMMER DEVICE FOR PIPE LINES UNDER PRESSURE

Emile Biclet, Paris, France

Application October 28, 1932, Serial No. 640,090
In France November 12, 1931

2 Claims. (Cl. 137—71)

The object of the present invention is to provide a device intended to be fitted on pipe lines carrying water or other fluid liquids under pressure, with a view to avoiding the well known phenomenon of water-hammering.

Three constructions of such a device are shown diagrammatically by way of example in Figures 1, 2, 3 and 4 of the accompanying drawing.

The device shown in Figure 1 comprises a fluid-tight chamber 1, in the lower part of which is mounted a suction pump or "Giffard" injector having its constituent elements 2 and 4 in the form of truncated cones connected, the element 2 by the conduit 3 to the supply of the fluid under pressure (pump, pipe line, etc.) and the part 4 by the conduit $4^1$ to the apparatus employing the said fluid (turbines, hydraulic presses or the like).

A conduit 5 adapted to be connected to a source 6 of compressed air opens into the upper part of the chamber 1.

Assuming that the conduit $4^1$ is closed, and the liquid under pressure arriving by the conduit 3, a certain quantity of this liquid has risen in the chamber 1 and has compressed the air in the part 1' of the chamber 1. The height of the level of the said liquid may be controlled by any suitable means usual in practice, for example by cocks 7.

If the conduit 4' is opened, the liquid under pressure flows freely, and on its passage through the parts 2—4 produces a suction effect, lowering the level of the liquid in the chamber 1 and creating above this level in 1' a certain drop in pressure which obviates the water-hammer.

When the conduit 4' is closed again, this drop in pressure will cause the liquid to flow back into the chamber 1 which will constitute an expansion and check chamber, owing to the air present in 1', and this as before, obviates the water-hammer.

The source 6 of compressed air enables the losses of air in the chamber due to solution to be compensated if necessary.

The modification shown in Figure 2 is more particularly intended to be fitted on the end of a conduit carrying liquid under pressure.

In this modification, the utilization conduits 4' are provided on the supply conduit 3 in front of the part 2 of the "Giffard" injector, and the part 4 is extended by a breather 8 opening into the upper end of the chamber 1. The conduit 5 of the device of Figure 2 opens into the upper part of the conduit 8.

It will be supposed that the valves 9 of the conduits 4' are open and the liquid is in equilibrium in the breather 8 and in the chamber 1. If the valves 9 are closed, the liquid passing the "Giffard" injector 2—4 produces a drop in pressure in the chamber 1. A portion of the liquid contained in this chamber, due to the predominating pressure in the pipe line 3, is forced into the breather 8, which runs over into the said chamber until equilibrium is re-established. This phenomenon produces a gradual check which eliminates the water-hammer.

In the modification shown in Figures 3 and 4, and more particularly intended to be mounted on the end of pipe lines, the fluid-tight chamber is combined with a breather at a low pressure relatively to the working pressure of the supply pipe line.

Figure 3 is a view in vertical section,

Figure 4 is a section taken along the line A—B in Figure 3.

As will be seen, in this device, the breather 8 described in Figure 2 has been omitted and replaced by a pipe 8 mounted in the fluid-tight chamber 1. The pipe 8 comprises a part 4 of the form of a truncated cone integral with a base 10 provided with orifices 10' and fixed at its periphery to the lower part of the said chamber 1. The element 2 is in the form of a truncated cone opens into the part 4 also in the shape of a truncated cone and forms with it a sort of suction pump or "Giffard" injector.

The operation is absolutely identical with that described with reference to Figure 2 and this point will not therefore be emphasized.

I claim:

1. An anti-water-hammer device for pipe lines carrying liquids under pressure, comprising a closed chamber partly filled with water, an inlet conduit for introducing a converging stream of liquid under pressure into the lower part of the chamber which is partly filled with water, a discharge conduit having a funnel-shaped end positioned in the lower portion of the chamber partly filled with water, said inlet conduit extending into the converging funnel-shaped end of the discharge conduit but without closing the funnel-shaped end, controllable means for bringing the water in the chamber to its initial level, controllable means for bringing the air in the chamber to its initial pressure, and means providing communication between the discharge conduit and the upper part of said chamber.

2. An anti-water-hammer device for pipe lines carrying liquids under pressure, comprising a closed chamber partly filled with water, an inlet conduit for introducing a converging stream of liquid under pressure into the lower part of the chamber which is partly filled with water, a discharge conduit having a funnel-shaped end positioned in the lower portion of the chamber partly filled with water, said inlet conduit extending into the converging funnel-shaped end of the discharge conduit but without closing the funnel-shaped end, controllable means for bringing the water in the chamber to its initial level, controllable means for bringing the air in the chamber to its initial pressure, means providing communication between the discharge conduit and the upper part of said chamber, and valved draw-off conduits communicating with the inlet conduit containing the liquid under pressure.

EMILE BICLET.